United States Patent
Cucknell et al.

(10) Patent No.: US 7,527,312 B1
(45) Date of Patent: May 5, 2009

(54) ADJUSTABLE LOAD FLOOR FOR A PASSENGER VEHICLE

(75) Inventors: Alan J E Cucknell, Cambridge (GB); Iain J Sabberton, Cambridge (GB); Peter D Cauwood, Cambridge (GB); Julian A Scarfe, Cambridge (GB); Jamie O Norris, Hereford (GB); Neil R Mason, Kendal (GB); Gordon Platto, Troy, MI (US); Rafael Rego, Salvador (BR); Amy Kim, Royak Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/972,925

(22) Filed: Jan. 11, 2008

(51) Int. Cl.
 *B60R 5/04* (2006.01)
(52) U.S. Cl. .................. 296/24.4; 296/193.07
(58) Field of Classification Search .............. 296/24.33, 296/24.4, 193.07, 187.09, 37.16, 183.1, 184.1; 224/496, 497, 498, 510, 522, 523, 529, 530
See application file for complete search history.

(56) References Cited

U.S. PATENT DOCUMENTS

| | | | |
|---|---|---|---|
| 2,887,216 A | | 5/1959 | Hargraves |
| 4,396,324 A | | 8/1983 | Ellis |
| 4,540,213 A | * | 9/1985 | Herlitz et al. .............. 296/37.5 |
| 4,779,779 A | | 10/1988 | Haugland |
| 5,035,184 A | * | 7/1991 | Bott ........................... 104/121 |
| 5,161,700 A | * | 11/1992 | Stannis et al. ............... 211/175 |
| 5,197,642 A | | 3/1993 | Cortelli |
| 5,228,739 A | | 7/1993 | Love |
| 5,456,514 A | * | 10/1995 | Justice ........................ 296/39.2 |
| 5,484,091 A | * | 1/1996 | Malinowski et al. ........ 224/542 |
| 5,674,023 A | | 10/1997 | Williams |
| 5,730,414 A | | 3/1998 | Wenger et al. |
| 6,290,441 B1 | | 9/2001 | Rusu |
| 6,543,659 B2 | | 4/2003 | Blair |
| 6,666,504 B2 | | 12/2003 | Guanzon et al. |
| 6,676,185 B2 | * | 1/2004 | Gehring et al. ............. 296/37.5 |
| 6,682,118 B2 | * | 1/2004 | Ryan .......................... 296/39.1 |
| 6,786,374 B2 | * | 9/2004 | Schlecht ..................... 224/544 |
| 6,811,196 B2 | * | 11/2004 | Gammon .................... 296/37.1 |
| 2003/0222475 A1 | * | 12/2003 | Nakamitsu et al. ........ 296/37.16 |
| 2005/0134075 A1 | * | 6/2005 | Kim ......................... 296/37.16 |
| 2005/0140156 A1 | * | 6/2005 | Mulvihill .................... 296/24.4 |
| 2005/0156445 A1 | * | 7/2005 | Mains ...................... 296/37.16 |
| 2005/0218680 A1 | * | 10/2005 | Mulvihill et al. ........... 296/24.4 |
| 2006/0022479 A1 | * | 2/2006 | Mulvihill et al. ......... 296/37.16 |
| 2008/0088147 A1 | * | 4/2008 | Choi ....................... 296/37.16 |
| 2008/0100082 A1 | * | 5/2008 | Heo ........................ 296/37.16 |

* cited by examiner

*Primary Examiner*—Jason S Morrow
(74) *Attorney, Agent, or Firm*—Gregory Brown; Brooks Kushman P.C.

(57) ABSTRACT

A passenger vehicle is provided with a body having front and rear ends with an interior and a rear cargo region that includes a load floor. A rear opening provides access to the rear cargo region and a rear wall extends above the load floor and defines a lower peripheral region of the opening. A closure member is connected to the vehicle body for enclosing the opening. An adjustable load floor member has a retracted position along the load floor, and an extended position aligned with a lower peripheral region for assisting loading of cargo into the rear cargo region. A passenger vehicle is provided with an adjustable load floor member having a retracted position along the load floor, and an extended position for dividing the rear cargo region into at least two compartments.

19 Claims, 4 Drawing Sheets

ADJUSTABLE LOAD FLOOR FOR A PASSENGER VEHICLE

BACKGROUND OF THE INVENTION

1. Field of the Invention

The invention relates to cargo regions in passenger vehicles.

2. Background Art

The prior art has provided passenger vehicles having cargo regions for stowing cargo. The prior art has provided systems with anchors and straps for securing cargo within the vehicle. The prior art has also offered cargo nets for securing cargo within the passenger vehicle. Additionally, the prior art has provided pockets and bins within the cargo region for storing cargo.

Many passenger vehicles have a cargo region with a load floor that is oriented beneath an access opening to the cargo region. For example, the load floor may be oriented below a striker and an associated region of the opening, such as a rear wall extending from the bumper. Often times cargo is slid across the elevated access opening into the cargo region. Other times, the cargo is lifted over the rear wall and striker.

SUMMARY OF THE INVENTION

An embodiment according to the present invention discloses a passenger vehicle with a vehicle body having a front end and a rear end. The vehicle body has an interior with a rear cargo region that includes a load floor. The vehicle body has a rear opening for providing access to the rear cargo region. The vehicle body has a rear wall extending above the load floor and defining a lower peripheral region of the rear opening. A closure member is operably connected to the vehicle body for closing the rear opening in a first position and for providing access to the rear cargo region in a second position. An adjustable load floor member has a retracted position along the load floor, and an extended position aligned with the lower peripheral region of the rear opening for assisting loading of cargo into the rear cargo region.

A further embodiment of the invention discloses that the adjustable load floor member has a load floor surface with a reduced coefficient of friction relative to that of the load floor.

Another further embodiment discloses that the adjustable load floor member further comprises a plurality of longitudinally oriented rails.

An even further embodiment discloses that the plurality of rails are spaced apart transversely.

Another further embodiment discloses that each rail has a cavity between the rail and the load floor in the extended position for permitting storage of cargo beneath the rails.

Yet another further embodiment discloses that the rails are oriented above the load floor in the retracted position.

Another further embodiment discloses that the load floor includes a plurality of recesses for receiving the rails such that the rails are flush with the load floor in the retracted position.

Another further embodiment discloses that the plurality of rails are independently adjustable.

An even further embodiment discloses that the plurality of rails are independently adjustable to a second extended position with an elevation greater than that of the first extended position for dividing the rear cargo region into at least two compartments.

Another further embodiment discloses a plurality of actuators each connected to one of the rails for adjusting the position of the rails.

Another further embodiment discloses a latching mechanism for securing the rails in the extended position for manual adjustment of the rails.

An even further embodiment discloses that the load floor includes a plurality of recesses that are each oriented adjacent to one of the rails to facilitate manual grasping of each rail for adjustment.

Another embodiment of the present invention discloses a passenger vehicle having a vehicle body with a front end and a rear end. The vehicle body has an interior with a rear cargo region that includes a load floor. The vehicle body has an opening for providing access to the rear cargo region. A closure member is operably connected to the vehicle body for enclosing the rear opening in a first position and for providing access to the rear cargo region in a second position. An adjustable load floor member has a retracted position along the load floor and an extended position for dividing the rear cargo region into at least two compartments.

A further embodiment discloses that the adjustable load floor divides the cargo region to at least two transversely separated cargo regions.

A further embodiment discloses that the adjustable load floor has at least one longitudinally oriented partition having a retracted position wherein the cargo region is undivided, and an extended position whereby the partition extends into the cargo region dividing the cargo region into at least two compartments.

An even further embodiment discloses that the adjustable load floor includes at least two longitudinally oriented partitions each having a retracted position wherein the cargo region is undivided, and an extended position whereby the partitions extend into the cargo region dividing the cargo region into at least three compartments.

Another further embodiment discloses that the adjustable load floor divides the cargo region to a lower cargo region and an upper cargo region displaced above the lower cargo region.

An even further embodiment discloses that the adjustable load floor further comprises at least two longitudinally oriented rails each having a cavity between the rail and the load floor in the extended position for permitting storage of cargo beneath the rails and upon the rails.

Yet another embodiment discloses a passenger vehicle having a vehicle body with a front end and a rear end. The vehicle body has an interior with a rear cargo region that includes a load floor. The vehicle body has a rear opening for providing access to the rear cargo region. The vehicle body has a rear wall extending above the load floor and defining a lower peripheral region of the rear opening. A closure member is operably connected to the vehicle body for enclosing the rear opening in a first position and for providing access to the rear cargo region in the second position. An adjustable load floor member has a retracted position along the load floor. The load floor member has a first extended position aligned with the peripheral region of the rear opening for assisting loading of cargo into the rear cargo region. The adjustable load floor member has a second extended position for dividing the rear cargo region into at least two compartments.

A further embodiment discloses that the second extended position of the adjustable load floor member has an elevation greater than that of the first extended position.

The above embodiments, and other embodiments, features, benefits and advantages of the present invention are readily apparent from the attached figures, and from the detailed description of embodiments of the invention set forth below.

DETAILED DESCRIPTION EMBODIMENTS OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
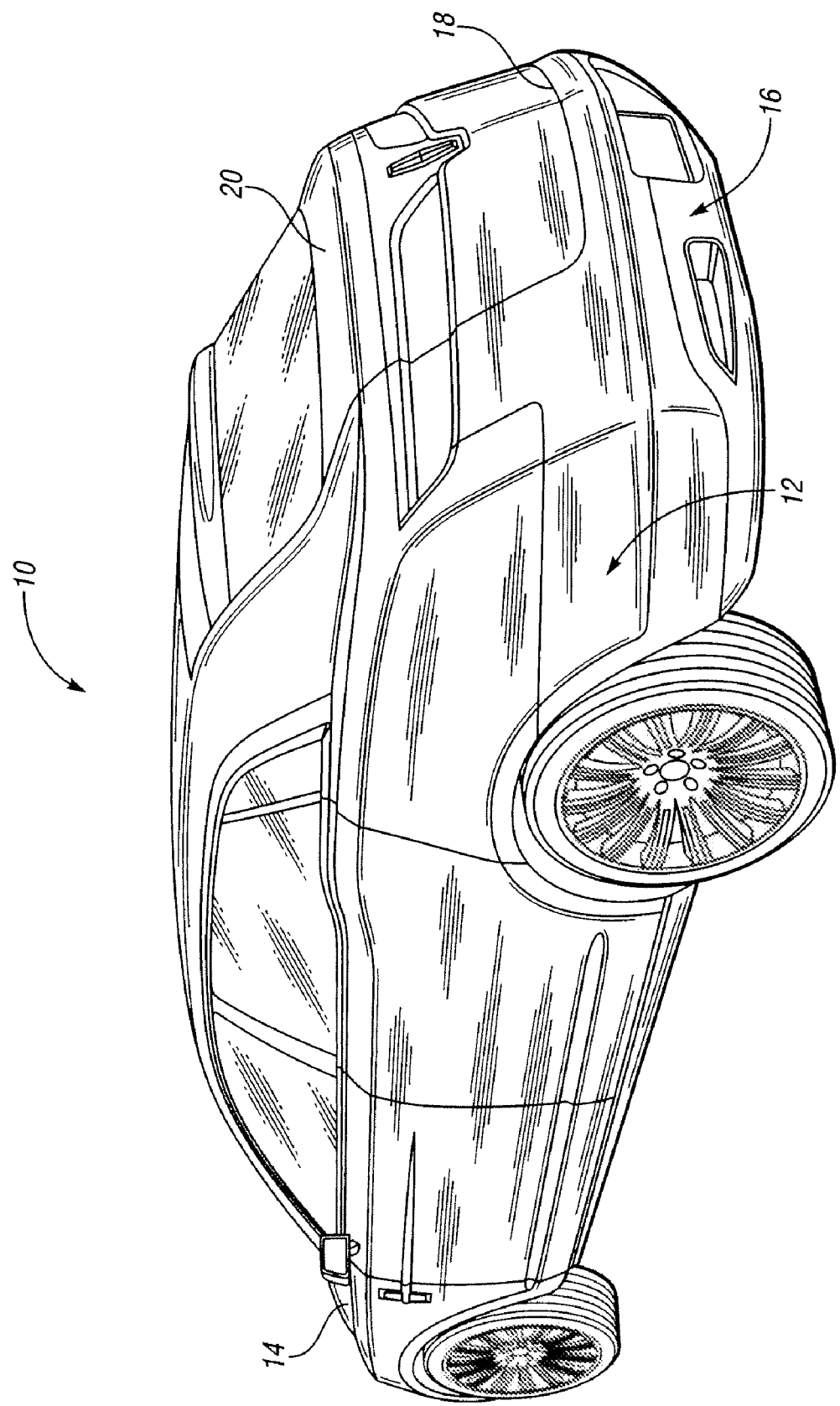
FIG. 1 is a perspective view of a passenger vehicle according to an embodiment of the present invention.

Referring now to FIG. 1, a passenger vehicle is illustrated and referenced generally by numeral 10. The vehicle 10 has a vehicle body 12 with a front end 14 and a rear end 16. The vehicle 10 is depicted as a sedan, however any vehicle body style is contemplated within the spirit and scope of the present invention, such as two-door coupes, or the like.

The vehicle 10 is depicted as a hatchback with a rear opening 18 that is enclosed by a liftgate 20. The rear opening 18 provides access to a rear cargo region 22 depicted in FIGS. 2-5. The invention contemplates any vehicle body style with any rear closure member such as sedans and two-door coupes with trunks; station wagons with liftgates, tailgates, or vertically hinged doors; vans, minivans, sport utility vehicles or cross-overs with liftgates, tailgates, vertically hinged doors, or the like.

Figure 2:
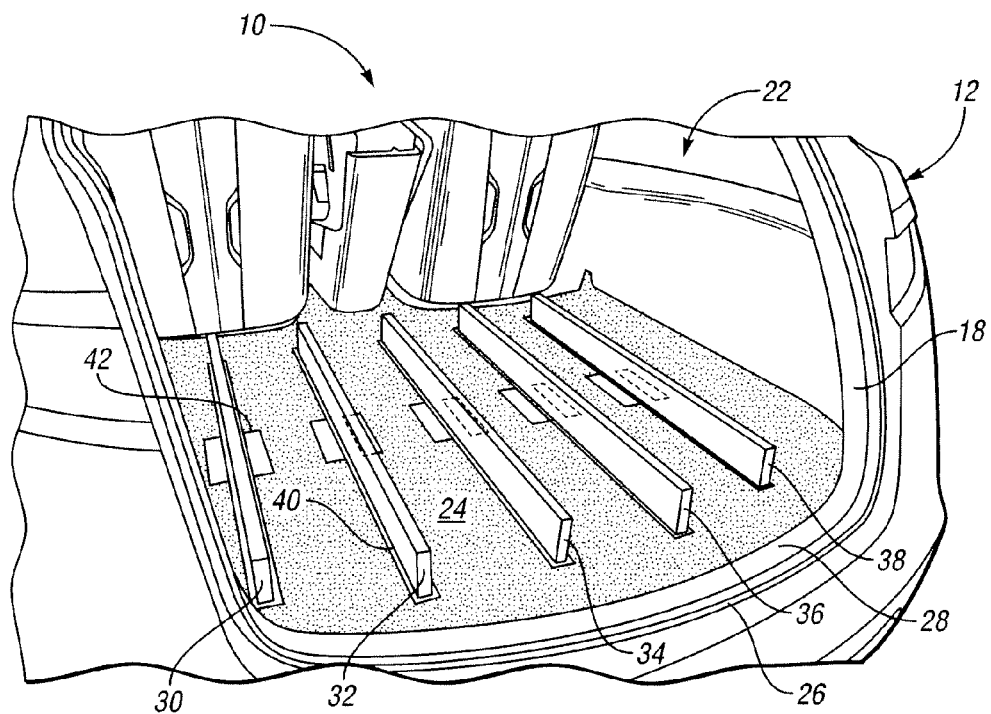
FIG. 2 is a rear perspective view of a cargo region of the passenger vehicle of FIG. 1, illustrated with load floor rails in an extended position.

The liftgate 20 is illustrated in a closed position in FIG. 1 enclosing the rear opening 18. Referring now to FIG. 2, the passenger vehicle 10 is illustrated with the liftgate 20 in an open position thereby revealing an interior of the vehicle body 12 with a rear cargo region 22. The rear cargo region 22 has a load floor 24 for receiving and supporting cargo. As is common with some vehicles, the vehicle body 12 includes a rear wall 26 extending to an elevation above that of the load floor 24. The rear opening 18 includes a lower peripheral region 28 that is defined by the rear wall 26. As is common with conventional hatchback or trunk vehicles, cargo must be loaded through the access opening 18 and subsequently lowered to the load floor 24. In order to assist with the loading of cargo to the load floor 24, a plurality of adjustable load floor rails 30, 32, 34, 36, 38 are provided. In the depicted embodiment, five load floor rails 30-38 are illustrated; however, the invention contemplates any number of load floor rails. The load floor rails 30-38 are oriented longitudinally across the load floor and extend a substantial length of the load floor 24. Additionally, the rails 30-38 are spaced transversely for spanning the width of the load floor 24.

The adjustable rails 30-38 each extend from apertures 40 formed within the load floor 24. Each of the rails 30-38 are independently adjustable and driven by an actuator 42 disposed beneath the load floor 24. The actuator 42 may be a direct current electric motor, such as a servo motor or stepper motor for adjusting the rails 30-38. Of course, any suitable actuator is contemplated within the spirit and scope of the present invention. The actuators 42 can be controlled through a vehicle control architecture whereby adjustment may be performed at the instrument panel, center console, a control pad within the rear cargo region 22, or upon a vehicle fob. Alternatively, the cargo rails 30-38 may be collectively actuated by a common actuator, with multiple clutches for controlling the independent actuation. In another alternative, the rails 30-38 may be collectively actuated by one actuator, which would prohibit independent adjustment of the rails 30-38.

The load floor rails 30-38 are illustrated in a first extended position in FIG. 2 at an elevation corresponding to that of a lower peripheral region 28 of the rear opening 18. Thus, a user can load cargo at the elevation of the lower peripheral region 28 without having to reach over the rear wall 26 and set the cargo upon the load floor 24. The cargo rails 30-38 have a reduced surface area in comparison to that of the load floor 24 thereby reducing a force of friction upon cargo that is conveyed into the rear cargo region 22. Additionally, a load floor surface of each of the rails 30-38 may be provided of a material with a reduced coefficient of friction relative to that of the load floor 24 for further assisting in sliding of cargo upon the rails 30-38.

Figure 3:
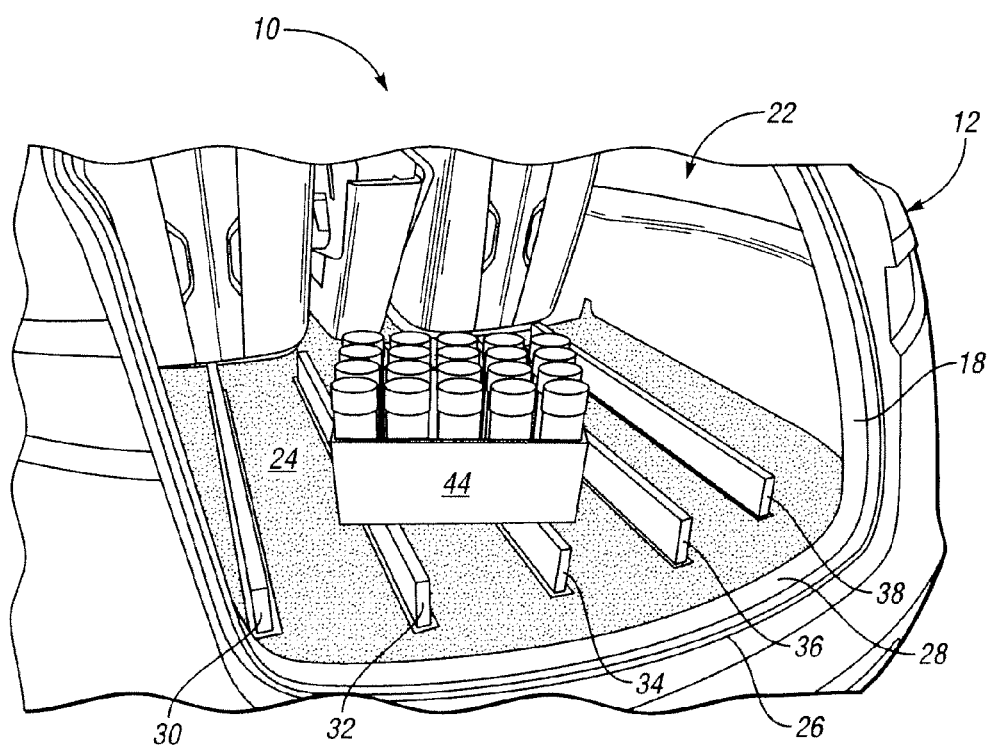
FIG. 3 is another perspective view of the rear cargo region of FIG. 2, illustrated with cargo loaded upon the load floor rails.
Figure 4:
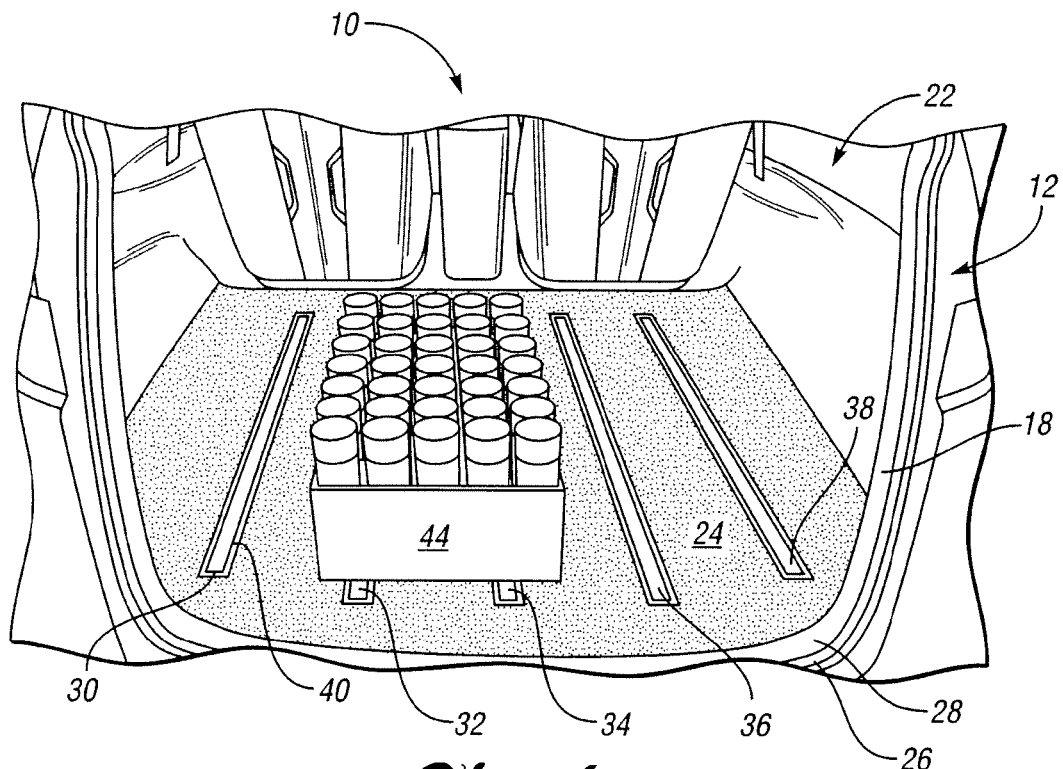
FIG. 4 is yet another rear perspective view of the rear cargo region of FIG. 2, illustrated with the load floor rails in a retracted position with cargo in the rear cargo region.

Referring now to FIG. 3, the rear cargo region 22 is illustrated with cargo 44 loaded upon two of the rails 32, 34. Once the cargo 44 is loaded upon the rails 30-38, the rails 30-38 can be lowered as illustrated in FIG. 4, thereby setting the cargo 44 upon the load floor 24. Thus, the rails 30-38 collectively provide an automated flat load flooring system upon which cargo 44 can be loaded and subsequently lowered to the load floor 24, without requiring the user to lower the cargo 44. In the retracted position of the rails 30-38, the rails 30-38 are generally flush to the load floor 24 such that the cargo 44 can be readily moved or organized within the rear cargo region 22, if desired.

Figure 5:
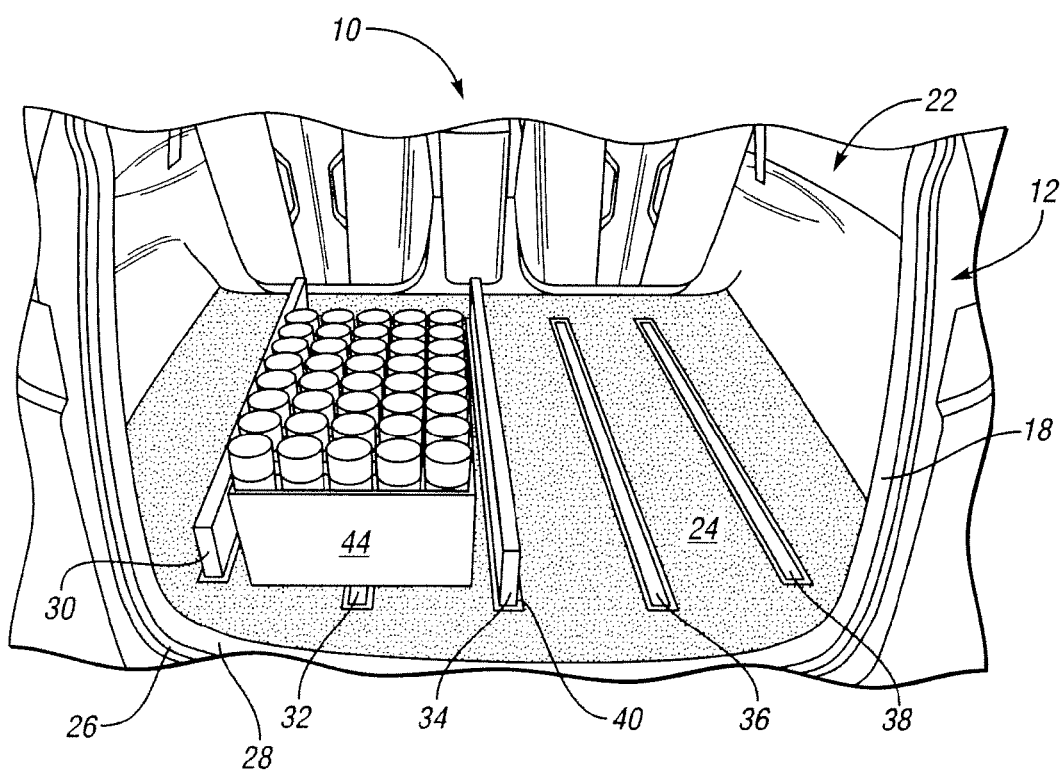
FIG. 5 is another rear perspective view of the rear cargo region of FIG. 2, illustrated with some of the load floor rails in another extended position.

The rails 30-38 also can be employed to define partitions within the rear cargo region 22 for compartmentalizing and organizing cargo within the rear cargo region 22. Since the rails 30-38 are independently adjustable, the compartments can be customized by the user. Referring now to FIG. 5, the cargo 44 has been moved between two of the rails 30, 34, which have subsequently been extended to retain the cargo 44 therebetween. The second extended position illustrated in FIG. 5 is greater than that for receiving cargo, as illustrated in FIG. 2, for providing a larger partition for the cargo 44. Due to the incremental transverse spacing of the rails 30-38, various transversely separated cargo regions may be provided with various widths to accommodate cargo 44 of varying sizes. The independent adjustment of the rails 30-38 permits the user to select the number of dividers and the sizes of the separated cargo regions.

Figure 6:
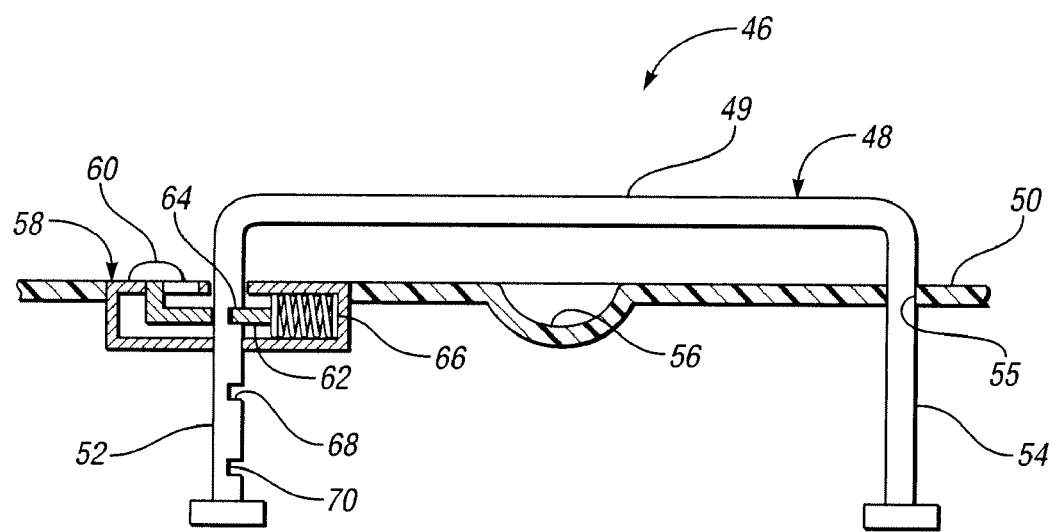
FIG. 6 is a side partial section view of a load floor according to another embodiment of the present invention, illustrated with a load floor rail in a retracted position.

Referring now to FIG. 6, a rear cargo region 46 is depicted according to another embodiment of the present invention. The rear cargo region 46 includes a series of tubular rails 48 with a longitudinal portion 49 extending across a load floor 50, and a pair of downward depending legs 52, 54 extending through a pair of apertures 55 in the load floor 50. In the retracted position illustrated in FIG. 6, the longitudinal portion 49 is displaced above the load floor 50 for facilitating loading of cargo at a height approximate to the load floor 50, such as in passenger vehicles that do not include a rear wall, such as vehicles with tailgates, or larger liftgates, or the like. The rails 48 are manually adjustable and therefore, a recess 56 is provided in the load floor 50 beneath each rail longitudinal portion 49 for permitting the user to grasp the longitudinal portion 49.

Since the rail 48 is manually actuated, a latch mechanism 58 is provided for securing the rail 48 at various height positions relative to the load floor 50. The latch mechanism 58 is similar to latch mechanisms provided on vehicle head restraints and includes a manual slide switch 60 for disengaging a striker 62 from a detent 64 within the leg 52. A spring 66 is provided in the latch mechanism 58 biasing the striker 62 with the detent 64 for maintaining the latch position. When the user actuates the slide button 60 in the direction of the arrow in FIG. 6, the striker 62 disengages from the detect 64 thereby permitting the user to raise the rail 48.

Figure 7:
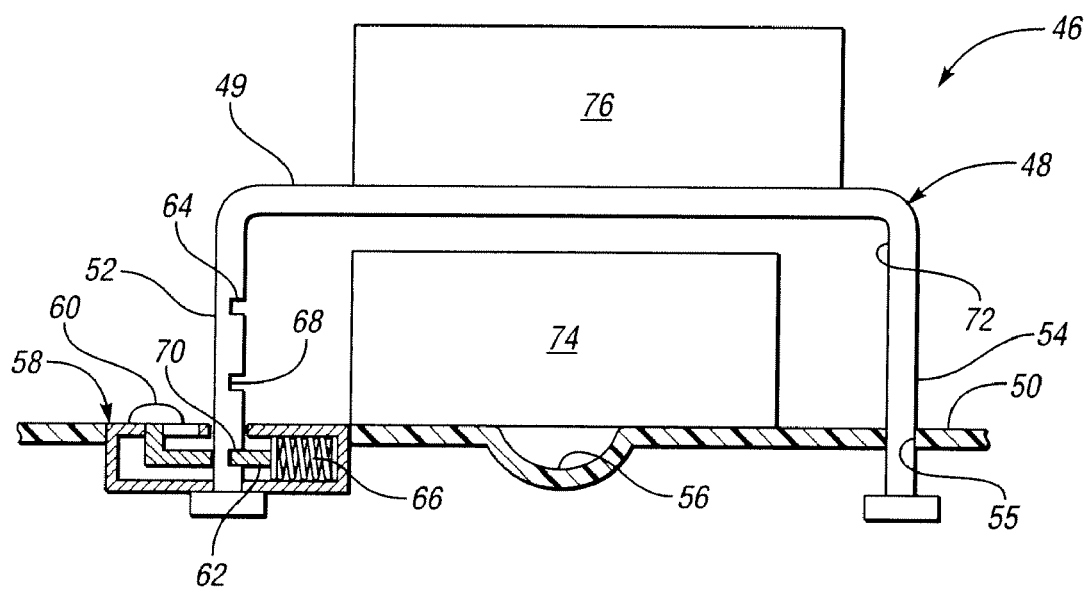
FIG. 7 is another partial section view of the load floor of FIG. 6, illustrated with the load floor rail in an extended position with cargo loaded upon the load floor and the load floor rail.

The rail 48 includes three positions in the embodiment depicted in FIGS. 6 and 7. There is a retracted position illustrated in FIG. 6. Also, there is an intermediate position, which is not illustrated but is represented by an intermediate detent 68, which may coincide with an elevation of a rear wall of the vehicle, if the vehicle includes a rear wall that requires the user to lift cargo over before lowering into the cargo region 46.

The rail 48 also has a fully extended position illustrated in FIG. 7 wherein the striker 62 is engaged to a lowermost detent 70. The open profile of the rails 48 collectively provide a cavity 72 beneath the longitudinal portions 49 such that a lower cargo region is provided for stowing cargo 74. Additionally, an upper cargo region is provided for receiving cargo 76 upon the longitudinal portion 49. Thus, the rails 48 permit divided cargo regions of various heights so that cargo 74, 76 does not have to be stacked upon each other.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A passenger vehicle comprising:
   a vehicle body having a front end and a rear end, the vehicle body having an interior with a rear cargo region that includes a load floor, the vehicle body having a rear opening for providing access to the rear cargo region, and the vehicle body having a rear wall extending above the load floor and defining a lower peripheral region of the rear opening;
   a closure member operably connected to the vehicle body for enclosing the rear opening in a first position and for providing access to the rear cargo region in a second position; and
   an adjustable load floor member having a retracted position along the load floor, and an extended position aligned with the lower peripheral region of the rear opening for assisting loading of cargo into the rear cargo region;
   wherein the adjustable load floor member further comprises a plurality of longitudinally oriented rails.

2. The passenger vehicle of claim 1 wherein the adjustable load floor member has a load floor surface with a reduced coefficient of friction relative to that of the load floor.

3. The passenger vehicle of claim 1 wherein the plurality of rails are spaced apart transversely.

4. The passenger vehicle of claim 1 wherein each rail has a cavity between the rail and the load floor in the extended position for permitting storage of cargo beneath the rails.

5. The passenger vehicle of claim 1 wherein the rails are oriented above the load floor in the retracted position.

6. The passenger vehicle of claim 1 wherein the load floor includes a plurality of apertures for receiving the rails such that the rails are flush with the load floor in the retracted position.

7. The passenger vehicle of claim 1 wherein the plurality of rails are independently adjustable.

8. The passenger vehicle of claim 7 wherein the plurality of rails are independently adjustable to a second extended position with an elevation greater than that of the first extended position for dividing the rear cargo region into at least two compartments.

9. The passenger vehicle of claim 7 further comprising a plurality of actuators each connected to one of the rails for adjusting the position of the rails.

10. The passenger vehicle of claim 7 further comprising a latching mechanism for securing the rails in the extended position for manual adjustment of the rails.

11. The passenger vehicle of claim 10 wherein the load floor includes a plurality of recesses each oriented adjacent to one of the rails to facilitate manual grasping of each rail for adjustment.

12. The passenger vehicle of claim 1 wherein
    the extended position divides the rear cargo region into at least two compartments.

13. The passenger vehicle of claim 12 wherein the adjustable load floor divides the cargo region to at least two transversely separated cargo regions.

14. The passenger vehicle of claim 13 wherein the adjustable load floor further comprises at least one longitudinally oriented partition having a retracted position wherein the cargo region is undivided, and an extended position whereby the partition extends into the cargo region dividing the cargo region into at least two compartments.

15. The passenger vehicle of claim 13 wherein the adjustable load floor further comprises at least two longitudinally oriented partitions each having a retracted position wherein the cargo region is undivided, and an extended position whereby the partitions extended into the cargo region dividing the cargo region into at least three compartments.

16. The passenger vehicle of claim 12 wherein the adjustable load floor divides the cargo region to a lower cargo region and an upper cargo region displaced above the lower cargo region.

17. The passenger vehicle of claim 16 wherein the adjustable load floor further comprises at least two longitudinally oriented rails each having a cavity between the rail and the load floor in the extended position for permitting storage of cargo beneath the rails and upon the rails.

18. The passenger vehicle of claim 1 wherein
    the extended position is further defined as a first extended position aligned with the lower peripheral region of the rear opening for assisting loading of cargo into the rear cargo region, and wherein the adjustable load floor has a second extended position for dividing the rear cargo region into at least two compartments.

19. The passenger vehicle of claim 18 wherein the second extended position of the adjustable load floor member has an elevation greater than that of the first extended position.

* * * * *